(12) United States Patent
Hattori

(10) Patent No.: US 10,116,181 B2
(45) Date of Patent: Oct. 30, 2018

(54) SLOT INSULATING PAPER

(71) Applicant: Hiroyuki Hattori, Okazaki (JP)

(72) Inventor: Hiroyuki Hattori, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 292 days.

(21) Appl. No.: 14/441,383

(22) PCT Filed: Nov. 6, 2013

(86) PCT No.: PCT/IB2013/002782
§ 371 (c)(1),
(2) Date: May 7, 2015

(87) PCT Pub. No.: WO2014/076564
PCT Pub. Date: May 22, 2014

(65) Prior Publication Data
US 2015/0311761 A1 Oct. 29, 2015

(30) Foreign Application Priority Data
Nov. 14, 2012 (JP) ................................. 2012-250335

(51) Int. Cl.
*H02K 3/34* (2006.01)
*H01B 3/52* (2006.01)

(52) U.S. Cl.
CPC .............. *H02K 3/345* (2013.01); *H01B 3/52* (2013.01)

(58) Field of Classification Search
CPC . H02K 3/32; H02K 3/34; H02K 3/345; H01B 3/02; H01B 3/04; H01B 3/52;
(Continued)

(56) References Cited

U.S. PATENT DOCUMENTS

| 4,162,340 A * | 7/1979 | Fuchs ....................... B32B 5/28 |
| | | 156/288 |
| 2003/0008102 A1* | 1/2003 | Berl ....................... H02K 3/345 |
| | | 428/119 |

(Continued)

FOREIGN PATENT DOCUMENTS

| JP | 58-170334 A | 10/1983 |
| JP | 61-170249 A | 7/1986 |

(Continued)

OTHER PUBLICATIONS

Partial English translation of Japanese Office Action dated Sep. 9, 2014 to corresponding JP Patent Application No. 2012-250335.

*Primary Examiner* — Tran Nguyen
(74) *Attorney, Agent, or Firm* — Sughrue Mion, PLLC

(57) ABSTRACT

A slot insulating paper (12) is arranged in a slot (18) of a core (10) of an electric motor or generator. In a state where the slot insulating paper (12) is spread in a sheet shape, a region (high stiffness portion (36)) that is part of the slot insulating paper (12) is a breakage resistance portion having a higher resistance against breakage than the other region (ordinary portion (38)). The slot insulating paper (12) may be formed by laminating a plurality of insulating layers. In the breakage resistance portion, for example, at least one of the laminated insulating layers is a high stiffness layer formed of a high stiffness material. Thus, the breakage resistance portion is formed to have a high stiffness. With a high stiffness, it is possible to improve breakage resistance.

10 Claims, 4 Drawing Sheets

(58) Field of Classification Search
CPC ........ H01B 17/00; H01B 17/56; H01B 17/60; B32B 29/00; B32B 29/02; C09J 4/02
USPC ............ 310/215; 17/110 N, 110 E, 110 PM, 17/119 C, 122 C, 137 R, 120 SR, 138 E
See application file for complete search history.

(56) References Cited

U.S. PATENT DOCUMENTS

| | | |
|---|---|---|
| 2004/0183391 A1 | 9/2004 | Kimura et al. |
| 2005/0101695 A1* | 5/2005 | Wada ..................... H02K 3/345 523/174 |
| 2009/0047858 A1* | 2/2009 | Kihara ................... B32B 27/34 442/381 |
| 2010/0141079 A1* | 6/2010 | Chu ....................... H02K 3/325 310/215 |
| 2010/0213784 A1 | 8/2010 | Iizuka et al. |

FOREIGN PATENT DOCUMENTS

| | | |
|---|---|---|
| JP | 04-210744 A | 7/1992 |
| JP | 2008-178197 A | 7/2008 |
| JP | 2009-071945 A | 4/2009 |
| JP | 2010-115040 A | 5/2010 |
| JP | 2011-200046 A | 10/2011 |
| WO | 2008/139912 A1 | 11/2008 |

* cited by examiner

SLOT INSULATING PAPER

BACKGROUND OF THE INVENTION

1. Field of the Invention

The invention relates to a slot insulating paper arranged in a slot of a core of an electric motor or generator.

2. Description of Related Art

An electric motor is an electrical device that includes two portions and that causes relative motion between the two portions by causing interaction of a shifting magnetic field, formed by supplying electric power to one of the portions, with the other one of the portions. The portion that forms the shifting magnetic field includes a core and coils. The core has a yoke extending in a direction in which the magnetic field shifts and teeth protruding from the yoke and arranged in the magnetic field shifting direction. A portion between any adjacent two of the teeth is called slot. The coils are formed such that conductive wires are wound around the teeth, with the result that the coils are partially located inside the slots.

In contrast to the electric motor that converts electric energy to mechanical energy, that is, relative motion between two members, a generator is an electrical device that converts relative motion between two members to electric energy. The structure of the generator is substantially the same as the structure of the electric motor, and a device that functions as both the electric motor and the generator is also known. Hereinafter, the electric motor will be described as an example; however, it should be understood that the generator and the device that functions as both the electric motor and the generator are not excluded.

In order to ensure electrical insulation between the core and coils of the electric motor, an insulating paper (hereinafter, referred to as slot insulating paper) may be arranged along the surfaces of the core, which define each of the slots. The known slot insulating paper is not only a so-called "paper" obtained by straining plant-based fiber but also a sheet made of a resin or a sheet made of a mineral, such as mica. Japanese Patent Application Publication No. 2008-178197 (JP 2008-178197 A) describes a slot insulating paper formed by laminating sheet materials having different characteristics (for example, see paragraph 0012). In addition, Japanese Patent Application Publication No. 2010-115040 (JP 2010-115040 A) also describes a slot insulating paper having multiple layers. Furthermore, Japanese Patent Application Publication No. 4-210744 (JP 4-210744 A) and Japanese Patent Application Publication No. 2011-200046 (JP 2011-200046 A) describe a slot insulating paper that ensures the strength of a portion of a sheet-shaped material by folding the portion.

SUMMARY OF THE INVENTION

A slot insulating paper is required not to break in order to ensure electrical insulation; however, easiness to break depends on a location inside a slot. For example, a portion that the coil strongly contacts is easy to break. However, each of the slot insulating papers respectively described in JP 2008-178197 A and JP 2010-115040 A is uniform as a whole, and does not show a configuration that resistance against breakage is partially increased. In JP 4-210744 A and JP 2011-200046 A, breakage of a portion of the slot insulating paper is prevented by folding and doubling the portion of the slot insulating paper; however, a working process for folding is required. In addition, workability of work for inserting the slot insulating paper into a slot may deteriorate due to reaction force that the folded portion attempts to return.

The invention improves breakage resistance of a desired portion in a slot insulating paper.

An aspect of the invention relates to a slot insulating paper arranged in a slot of a core of an electric motor or generator. The slot insulating paper includes a breakage resistance portion that constitutes a region that is part of the slot insulating paper in a state where the slot insulating paper is spread in a sheet shape. The breakage resistance portion has a higher resistance against breakage than the other region of the slot insulating paper.

The slot insulating paper may include a plurality of insulating layers. The plurality of insulating layers may be laminated. In the breakage resistance portion, at least one of the plurality of insulating layers may be a high stiffness layer. The high stiffness layer may be formed of a material having a higher stiffness than a material that forms the plurality of insulating layers in the other region. With the high stiffness layer, the breakage resistance portion becomes hard to deform. Thus, the possibility of breakage due to deformation, such as folding, is reduced.

In the slot insulating paper, the thickness of each of the insulating layers, including the high stiffness layer, may be uniform. This is implemented by equalizing the thicknesses of the high stiffness layer and the other ordinary layer within the one insulating layer. With this configuration, in comparison with the case where high stiffness is obtained by increasing the thickness of the layer, a substantial reduction in cross-sectional area of the slot due to arrangement of the slot insulating paper reduces.

In the slot insulating paper, the breakage resistance portion may face a bottom face of the slot when the slot insulating paper is arranged in the slot. At time of inserting the slot insulating paper into the slot, workability of the insertion work improves by inserting the slot insulating paper such that the breakage resistance portion is placed along the bottom face of the slot. Due to the high stiffness of the breakage resistance portion, buckling or breakage at the time of insertion of the slot insulating paper is suppressed.

The slot insulating paper may include the insulating layer that does not include the high stiffness layer. The at least one insulating layer that does not include the high stiffness layer may be a single sheet layer formed of a single sheet material. The slot insulating paper may include the insulating layer that includes the high stiffness layer and an ordinary layer having a lower stiffness than the high stiffness layer. Each of the high stiffness layer and the ordinary layer may be bonded to the single sheet layer by adhesive agent. The high stiffness layer and the ordinary layer may not be directly connected to each other in the insulating layer that includes the high stiffness layer and the ordinary layer. Thus, folding becomes easy at the boundary between the high stiffness layer and the ordinary layer.

The slot insulating paper may include a plurality of insulating layers. The plurality of insulating layers may be laminated via adhesive agent. The thickness of a layer of the adhesive agent at the breakage resistance portion may be larger than the thickness of a layer of the adhesive agent in the other region. Because the layer of the adhesive agent becomes thick, the slot insulating paper corresponding to this portion easily bends due to the elastic action of the adhesive layer, so it is possible to suppress breakage due to deformation.

When the slot insulating paper is arranged in the slot, the breakage resistance portion may be located at an end portion of the slot in a direction in which the slot extends. Thus, the slot insulating paper easily deforms following bending of a conductive wire of a coil, so it is possible to suppress breakage due to deformation.

The breakage resistance portion may be a high stiffness portion having a higher stiffness than the other region. The high stiffness portion may be a band-shaped portion of the slot insulating paper along a direction in which the slot extends when the slot insulating paper is arranged in the slot.

Both ends of the slot in the direction in which the slot extends may be open.

The high stiffness portion may face a bottom face of the slot, when the slot insulating paper is arranged in the slot and when the slot insulating paper is formed so as to match a cross-sectional shape of the slot.

By providing the breakage resistance portion at only a required portion, the cost of the slot insulating paper is reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings. Between relatively movable two portions of an electric motor, generally, one of the two portions is fixed, and the other one of the two portions is movable. The movable portion is of a type that rotates around one axis, and this electric motor is of a rotary type. In the rotary-type electric motor, the movable portion is called rotor, and the fixed portion is called stator. In addition, there is also known a so-called linear electric motor in which the movable portion moves along a straight line or a free-form curve. In the linear electric motor, the movable portion is called slider, or the like, and the fixed portion is called stator. Hereinafter, high stiffness portion refers to a reinforced portion, high stiffness layer refers to a reinforced layer, ordinary portion refers to a non-reinforced portion, and ordinary layer refers to a non-reinforced layer.

Figure 1:
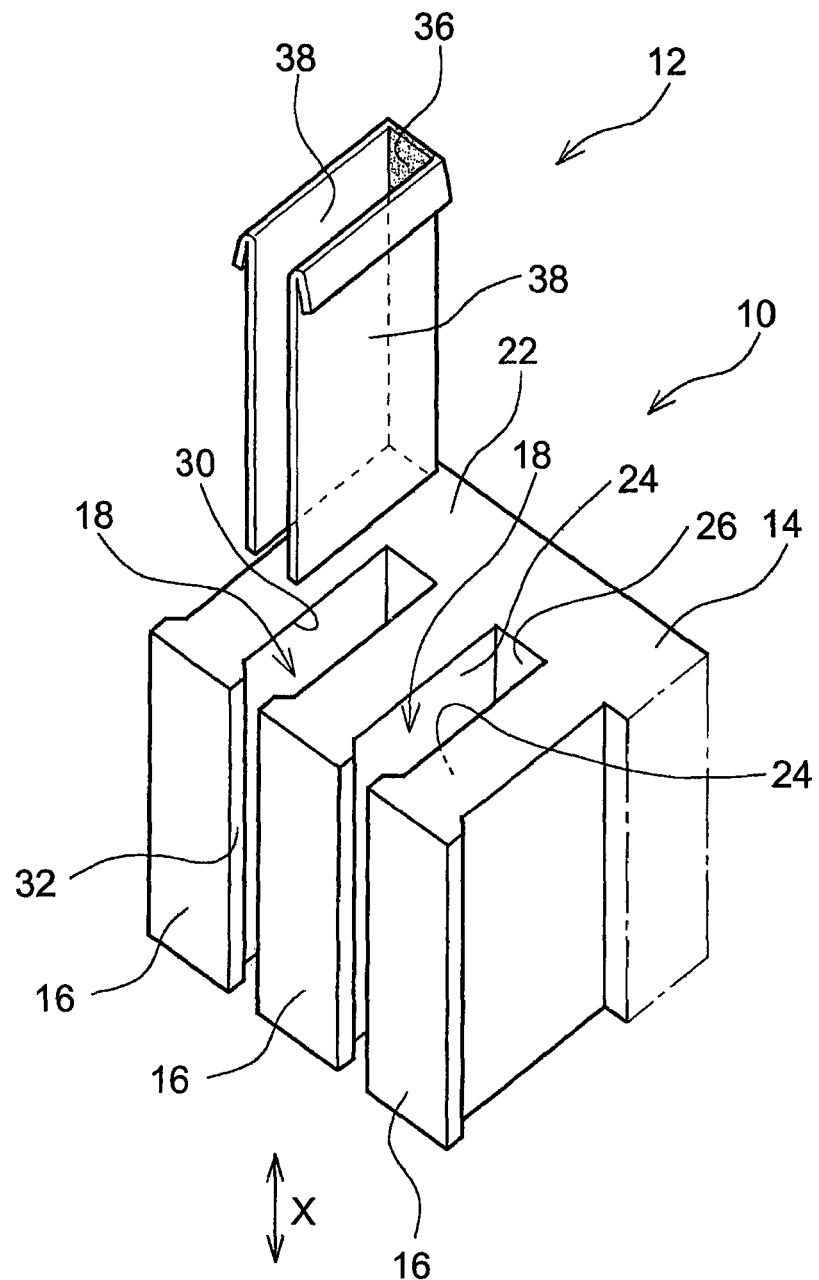
FIG. 1 is a perspective view that shows a slot insulating paper according to the invention together with a core.
Figure 2:
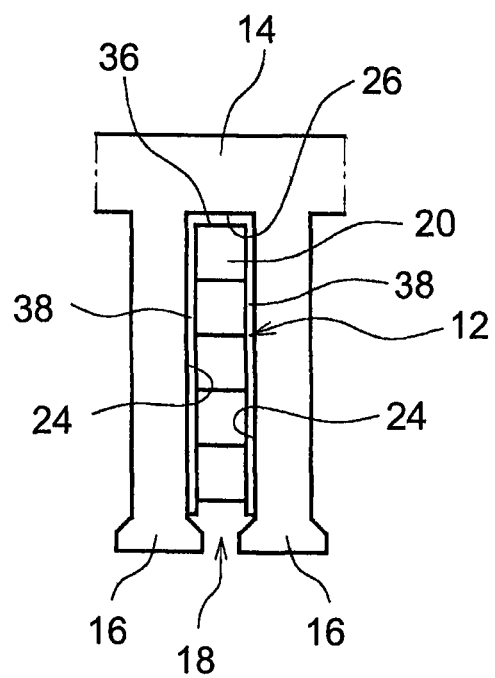
FIG. 2 is a view that shows a state where the slot insulating paper and a coil are accommodated in a slot.

FIG. 1 shows a core 10 and slot insulating paper 12 of the stator of the electric motor. The core 10 has a yoke 14 and teeth 16 protruding from the yoke 14 and arranged in a direction in which the yoke 14 extends. A space between any adjacent two of the teeth 16 is called slot 18, and a conductive wire of a coil 20 is arranged in the slot 18 as shown in FIG. 2. The yoke 14 shown in FIG. 1 extends linearly, and the core 10 is a core of a linear electric motor. If a yoke is arranged so as to extend along a circumference and then teeth are protruded inward of the circle, it becomes a core of a rotary-type electric motor, particularly, an inner-rotor-type electric motor. The core 10 may be formed by laminating thin sheets, such as electromagnetic steel sheets. A lamination direction is an X direction shown in FIG. 1.

The coils 20 are wound around the teeth 16. A conductive wire that forms one of the coils 20 is arranged in one of the slots 18 in a direction in which the slot 18 extends, exits from an end (upper face or lower face in FIG. 1) of the slot 18, and extends toward another one of the slots 18 along an end face 22 of the core 10. The conductive wire enters the another one of the slots, exits from the opposite end face, extends again toward another one of the slots or the original slot, and enters the intended slot. This is repeated, and each coil 20 is formed. A portion of each coil 20, which exits from one of the slots 18 and extends to another one of the slots 18, that is, a portion located along the end face 22 of the core 10, is called coil end.

The coils 20 are arranged in a direction in which the stator extends, and predetermined alternating-current power is supplied to these coils 20. Thus, the coils 20 are able to form magnetic fields that shift in a direction in which the teeth 16 are arranged. By providing a configuration that interacts with the shifting magnetic fields in the slider or the rotor (for example, arranging a permanent magnet), the slider or the rotor moves as the magnetic fields shift.

Each of the slots 18 is a space defined by side faces 24 of facing two of the teeth 16 and a side face 26 of the yoke 14, and is a groove-shaped space that extends in the X direction in FIG. 1. Assuming that each slot 18 is a groove, the side face 26 of the yoke 14 is referred to as slot bottom face 26 and the side faces 24 of each of the teeth 16 are referred to as slot wall faces 24. In addition, a direction in which the groove extends is referred to as a direction in which the slot 18 extends. Both ends in the direction in which the slot 18 extends are open, and these portions are referred to as slot end openings 30. In addition, each slot 18 is also open at a face located at the opposite side across from the slot bottom face 26, and this portion is referred to as slot top opening 32. As shown in the drawing, the distal end of each of the teeth 16 is widened in the teeth arrangement direction, and each slot top opening 32 is narrower than the groove width of a portion of each slot 18, other than the top portion (the width of each slot in the teeth arrangement direction, that is, a distance between facing two of the teeth) accordingly. In the case of the core of the inner-rotor-type electric motor, a clearance between facing two slot wall faces narrows inward. Therefore, the width of each slot top opening is considerably narrower than that of each slot bottom face.

Each slot insulating paper 12 is formed of a sheet-shaped raw material folded so as to match the shape of each slot 18, and is accommodated in the slot 18. As shown in FIG. 1, each slot insulating paper 12 is folded into a substantially Π shape, and is inserted from one of the slot end openings 30 in the direction in which the slot 18 extends. The reason why the slot insulating paper 12 is inserted from the slot end opening 30 in this way is that it is difficult to insert the slot insulating paper 12 from the slot top opening 32 because the slot top opening 32 is narrow and that it is possible to suppress further deformation of the slot insulating paper 12 formed in a substantially Π shape when inserted from the slot end opening 30. After each slot insulating paper 12 is accommodated in a corresponding one of the slots 18, conductive wires are wound around the core 10, and the coils 20 are formed.

FIG. 2 is a view that shows the cross-sectional view of the stator in a state where the coil 20 is wound. Each slot insulating paper 12 is arranged along the slot wall faces 24 and the slot bottom face 26 that are the inner surfaces of the slot 18. The conductive wire of each coil 20 is arranged further inward of the slot insulating paper 12. The slot insulating paper 12 is interposed between the coil 20 and the core 10, and electrical insulation therebetween is ensured.

Figure 3A:
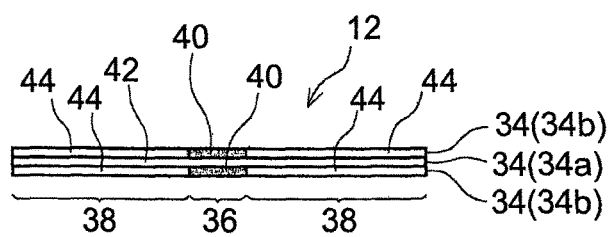
FIG. 3A and FIG. 3B are views that show a state where the slot insulating paper is spread.
Figure 3B:
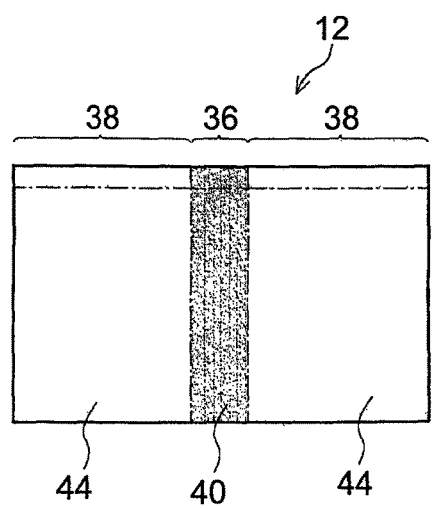

FIG. 3A and FIG. 3B are views that show a state where the slot insulating paper 12 is spread in a flat shape before being folded into a substantially Π shape. The sheet face of the slot insulating paper 12 is shown in FIG. 3B, and an upper-side end face in FIG. 3B is shown in FIG. 3A. The thickness, that is, the vertical size in FIG. 3A, is exaggerated, and an actual thickness is by far thinner. The slot insulating paper 12 has a plurality of, for example, three, laminated insulating layers 34. The insulating layers 34 have the same shape, and are connected to one another to form a single sheet. The insulating layers 34 may be, for example, connected to one another by bonding the insulating layers 34 with the use of adhesive agent.

In a state where the slot insulating paper 12 is spread, a region that is part of the slot insulating paper 12 serves as a high stiffness portion 36 having a higher stiffness than the other region. The other region, that is, a region other than the high stiffness portion 36, is a portion having an ordinary stiffness and having a lower stiffness than the high stiffness portion 36, and, hereinafter, referred to as ordinary portion 38. The state where the slot insulating paper 12 is spread means a flat state where there is neither a mountain or valley formed through folding nor a doubly folded portion. Thus, the high stiffness portion 36 is not formed to have a high stiffness by folding a slot insulating paper, for example, by increasing the cross-sectional size through formation of the paper in a wavy shape as in the case of corrugated paper.

The location of the high stiffness portion 36 in the slot insulating paper 12 is a location at which the high stiffness portion 36 faces the slot bottom face 26 when the slot insulating paper 12 is arranged in the slot. In FIG. 3B, the high stiffness portion 36 provided in a band-shaped region that is located at the center in the horizontal direction of the slot insulating paper 12 and that extends vertically as a whole, and both horizontal sides of the slot insulating paper 12, other than the high stiffness portion 36, are the ordinary portions 38. The slot insulating paper 12 is folded at the boundary between the high stiffness portion 36 and each of the ordinary portions 38, and is formed into a substantially Π shape. In the slot insulating paper 12, a portion sandwiched by the two portions folded in a Π shape is the high stiffness portion 36, and the remaining portions are the ordinary portions 38.

In the high stiffness portion 36, among the insulating layers 34 that constitute the high stiffness portion 36, at least one of the insulating layers 34 that constitute the high stiffness portion 36 is formed of a material having a higher stiffness than the insulating layers 34 that constitute the ordinary portions 38. The layer having a high stiffness is referred to as high stiffness layer 40 hereinafter. On the other hand, the layers other than the high stiffness layer 40 may be formed of a material having the same property as the insulating layers 34 that constitute the ordinary portions 38.

Among three insulating layers 34 of the slot insulating paper 12, the center insulating layer 34a is a single sheet layer 42 formed of a single sheet material. The single sheet layer 42 constitutes one insulating layer of each ordinary portion 38, and also constitutes the layer other than the high stiffness layers 40 of the high stiffness portion 36. That is, the single sheet layer 42 is formed of a material having a lower stiffness than the high stiffness layer 40. The insulating layers 34b located vertically on both sides of the center insulating layer 34a each are formed of the high stiffness layer 40 and an ordinary layer 44 formed of a material having a lower stiffness than the high stiffness layer 40. A region belonging to the high stiffness portions 36 of the both-side insulating layers 34b is formed of the high stiffness layer 40, and a region belonging to the ordinary portions 38 is formed of the ordinary layer 44. The material of each ordinary layer 44 may be the same as the single sheet layer.

The high stiffness layer 40 and the ordinary layers 44 are respectively connected to the single sheet layer 42. The high stiffness layer 40 and each ordinary layer 44 may not be directly connected to each other (indirectly connected or separated). Thus, the slot insulating paper 12 is easily folded at the boundaries between these layers. In addition, the thickness of the high stiffness layer 40 may be equal to the thickness of each ordinary layer 44. Thus, the thickness of each of the both-side insulating layers 34b is uniform, and the overall thickness of the slot insulating paper 12 is also uniform. Because the thickness is not increased in order to provide the high stiffness portion 36, the cross-sectional area of the space in each slot 18 is ensured, and a space factor of the coil is maintained.

The materials of the single sheet layer 42 and ordinary layers 44 may be, for example, an aramid nonwoven fabric or a polyethylene resin film. In addition, the material of the high stiffness layer 40 may be, for example, a fiber-reinforced plastic formed by impregnating epoxy resin, acrylic resin, or the like, with a woven fabric or nonwoven fabric of glass fiber or aramid fiber.

In a process of accommodating each slot insulating paper 12 into the slot 18, first, the flat sheet-shaped slot insulating paper 12 shown in FIG. 3A and FIG. 3B is folded and is formed into a substantially Π shape shown in FIG. 1. Each slot insulating paper 12 is formed into a predetermined shape by folding the slot insulating paper 12 along the alternate long and short dashed lines in FIG. 3B. Subsequently, each slot insulating paper 12 is inserted into the slot from the slot end opening 30. At this time, the high stiffness portion 36 is placed along the slot bottom face 26, and the high stiffness portion 36 is pushed. Because the slot wall faces 24 are located on both sides of the slot bottom face 26, the high stiffness portion 36 is guided by these wall faces 24. Thus, it is possible to carry out stable insertion. The high stiffness portion 36 has a high stiffness, so, even when this portion is pushed at the time of insertion, the portion does not buckle or break, with the result that work becomes easy. Furthermore, each slot insulating paper 12 is easily folded along a folding line between the high stiffness portion 36 and each ordinary portion 38 as described above, and reaction force against folding is small. Thus, it is possible to easily keep the cross-sectional shape of each slot insulating paper 12 in a substantially Π shape, and insertion of each slot insulating paper 12 into the slot becomes easy. Furthermore, the high stiffness portion 36 is located at the center in the Π shape, and the two ordinary portions 38 each having substantially the same configuration are located on both sides of the high stiffness portion 36, so it is possible to carry out insertion in a state where resistance forces that the two ordinary portions 38 receive at the time of insertion balance with each other and do not become unbalanced.

A face of each ordinary portion 38, which contacts the coil 20, may be made of a material that allows the conductive wire of the coil 20 to easily slide. Even when the stiffness of the material is low, deterioration of workability is suppressed by pushing the high stiffness portion 36 at the time of insertion.

As described above, with the slot insulating paper 12 according to the present embodiment, it is possible to solve the task of improving workability at the time of inserting the slot insulating paper 12 into the slot 18. In a state where the slot insulating paper 12 is spread in a sheet shape, the band-shaped region along the direction (X direction in FIG. 1) in which the slot extends when the slot insulating paper 12 is accommodated in the slot serves as the high stiffness portion 36 having a higher stiffness than the other region. Insertion into the slot 18 is made along the direction in which the band-shaped high stiffness portion 36 extends. Even when insertion is made by pushing the high stiffness portion 36, the high stiffness portion 36 has a high stiffness and is hard to undergo deformation, such as buckling. Thus, insertion work becomes easy. In addition, breakage due to deformation, such as buckling, is also suppressed.

When each slot insulating paper 12 has a multilayer structure, at least one layer is made of a material having a higher stiffness than the other portion. Thus, the high stiffness portion 36 is formed.

Figure 4:
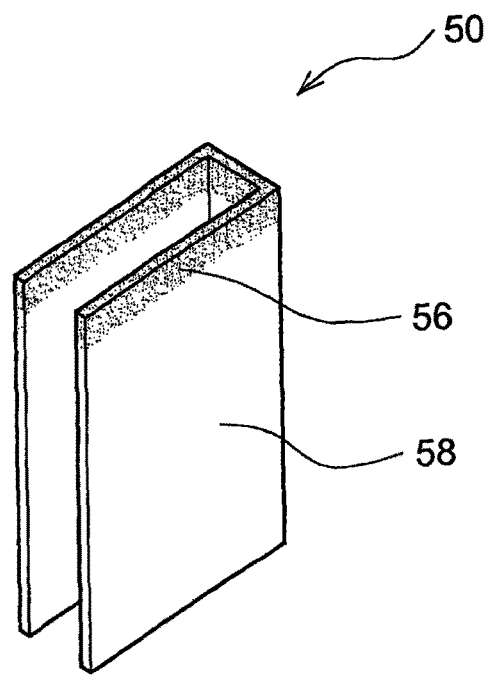
FIG. 4 is a perspective view that shows another slot insulating paper according to the invention.
Figure 5A:
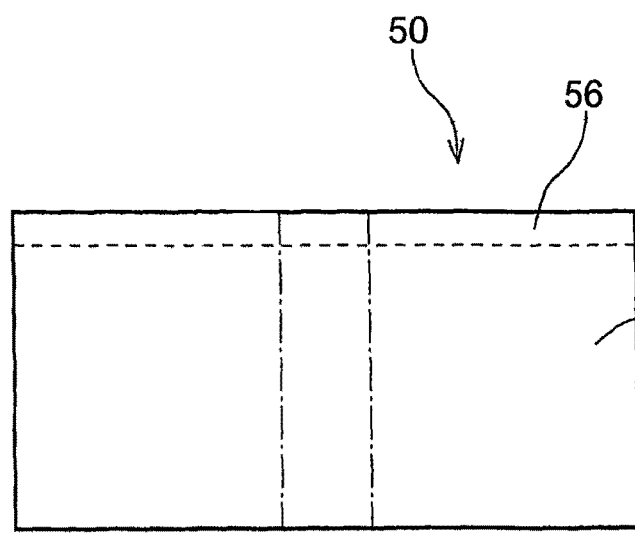
FIG. 5A and FIG. 5B are views that show a state where the slot insulating paper shown in FIG. 4 is spread.
Figure 5B:
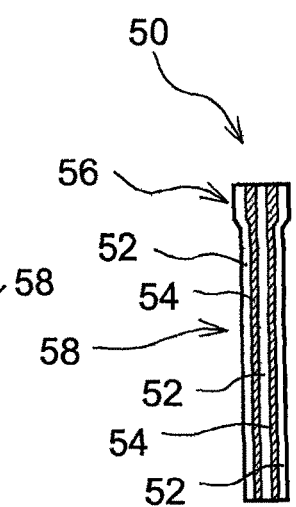

FIG. 4, FIG. 5A and FIG. 5B show another example of each slot insulating paper. A core to which each slot insulating paper 50 is inserted is the same as that shown in FIG. 1 and FIG. 2, so the description is omitted. FIG. 5A and FIG. 5B show a state where the slot insulating paper 50 is spread in a flat shape before being folded and formed into a substantially Π shape. The sheet face of the slot insulating paper 50 is shown in FIG. 5A, and a right-side end face in FIG. 5A is shown in FIG. 5B. The thickness, that is, the horizontal size in FIG. 5B, is exaggerated, and an actual thickness is by far thinner. The slot insulating paper 50 has a plurality of, for example, three, insulating layers 52. The insulating layers 52 have the same shape, and are connected and laminated with one another with the use of adhesive agent to form a single sheet. Each layer of the adhesive agent is referred to as adhesive layer 54. The material of each insulating layer 52 may be, for example, an aramid nonwoven fabric or a polyethylene resin film.

In the slot insulating paper 50, each adhesive layer 54 is thickened near the upper side in FIG. 5A. It is possible to thicken each adhesive layer 54 as shown in FIG. 5B by increasing the amount of application of adhesive agent to this portion. This portion allows deviation between the laminated insulating layers 52 as compared to the other portion due to pliability of adhesive agent, thus allowing deformation, such as bending and warping, of the slot insulating paper 50. That is, the portion having the thickened adhesive layers 54 has a high pliability. This portion is referred to as pliable portion 56, and the other portion is referred to as ordinary portion 58. The pliable portion 56 has a high resistance against breakage due to its pliability. That is, in the slot insulating paper 50, the pliable portion 56 is a portion of which resistance against breakage is higher than that of the ordinary portion 58.

When the slot insulating paper 50 is accommodated in the slot 18, the pliable portion 56 is located at an end portion of the slot 18, that is, an edge of the slot end opening 30 and around the edge. In a portion of the coil end, the conductive wire of the coil 20, which exits from the slot 18, is bent in a direction along the end face of the core 10. The slot insulating paper 50 is also bent following bending of the conductive wire of the coil 20. The pliable portion 56 well follows bending of the conductive wire due to its pliability, so the slot insulating paper 50 becomes hard to break. In addition, in forming the coil end as well, because the slot insulating paper 50 is pliable, reaction force from the slot insulating paper 50 is small, so work becomes easy. Furthermore, the slot insulating paper 50 becomes hard to break, so it is possible to bend the conductive wire of the coil 20 by a larger amount, and it is possible to reduce the size of the coil end portion.

The invention claimed is:

1. A slot insulating paper arranged in a slot of a core of an electric motor or generator, the slot insulating paper comprising:
    a plurality of insulating layers, the plurality of insulating layers having a same shape are laminated, and each insulating layer is connected to another insulating layer to constitute a single sheet, and
    a breakage resistance portion that constitutes a region that is part of the slot insulating paper in a state where the slot insulating paper is spread flat, the breakage resistance portion having a higher resistance against breakage than a remaining region of the slot insulating paper,
    wherein the slot insulating paper has a uniform thickness;
    wherein in the breakage resistance portion, at least one layer includes a reinforced layer;
    wherein the plurality of insulating layers includes at least an insulating layer that does not include a reinforced layer, wherein the at least one insulating layer that does not include the reinforced layer is a single sheet layer formed of a single sheet material,
    the at least one insulating layer that includes the reinforced layer includes non-reinforced layer,
    the at least one insulating layer is bonded to the single sheet layer by an adhesive agent, and
    in the at least one insulating layer that includes the reinforced layer and the non-reinforced layer, the reinforced layer and the non-reinforced layer are not directly connected to each other.

2. The slot insulating paper according to claim 1, wherein a thickness of each of the insulating layers that includes the reinforced layer is uniform.

3. The slot insulating paper according to claim 1, wherein the breakage resistance portion faces a bottom face of the slot when the slot insulating paper is arranged in the slot.

4. The slot insulating paper according to claim 1, wherein
    the plurality of insulating layers are laminated via adhesive agent, and
    a thickness of a layer of the adhesive agent at the breakage resistance portion is larger than a thickness of a layer of the adhesive agent in the remaining region.

5. A core of an electric motor or generator comprising a slot and the slot insulating paper according to claim 4,
    wherein when the slot insulating paper is arranged in the slot having a slot top opening to a slot bottom face and extends in a direction perpendicular to the slot top opening, the breakage resistance portion is located at the slot bottom face of the slot in the direction the slot extends.

6. The core according to claim 5, wherein
    the breakage resistance portion is a reinforced portion having a higher stiffness than the remaining region, and
    the reinforced portion is a band-shaped portion of the slot insulating paper.

7. The core according to claim 5, wherein both ends of the slot in the direction the slot extends are open.

8. The core according to claim 6, wherein the reinforced portion faces the bottom face of the slot, when the slot insulating paper is arranged in the slot and when the slot insulating paper is formed so as to match a cross-sectional shape of the slot.

9. The core according to claim 6, wherein both ends of the slot in the direction the slot extends are open.

10. The slot insulating paper according to claim 1, wherein the at least one layer that includes the reinforced layer includes non-reinforced layers connected to both ends of the reinforced layer in a width direction.

\* \* \* \* \*